United States Patent
Tang et al.

(10) Patent No.: US 8,104,129 B2
(45) Date of Patent: Jan. 31, 2012

(54) OPEN AND CLOSE APPARATUS FOR A SHELTER OF A BOARDING BRIDGE

(75) Inventors: Xue Gong Tang, Guangdong (CN); Zhao Hong Zhang, Guangdong (CN)

(73) Assignees: Shenzhen CIMC-Tianda Airport Support Ltd., Guangdong (CN); China International Marine Containers (Group) Ltd., Guangdong (CN)

( * ) Notice: Subject to any disclaimer, the term of this patent is extended or adjusted under 35 U.S.C. 154(b) by 88 days.

(21) Appl. No.: 12/668,130

(22) PCT Filed: Jun. 11, 2007

(86) PCT No.: PCT/CN2007/001831
§ 371 (c)(1), (2), (4) Date: Feb. 1, 2010

(87) PCT Pub. No.: WO2008/113223
PCT Pub. Date: Sep. 25, 2008

(65) Prior Publication Data
US 2010/0175204 A1     Jul. 15, 2010

(30) Foreign Application Priority Data
Mar. 22, 2007   (CN) .......................... 2007 1 0073676

(51) Int. Cl.
*E01D 15/10* (2006.01)
*B64F 1/30* (2006.01)
(52) U.S. Cl. ......................................................... 14/71.5
(58) Field of Classification Search ................... 14/69.5, 14/71.5
See application file for complete search history.

(56) References Cited

U.S. PATENT DOCUMENTS

| | | | | |
|---|---|---|---|---|
| 3,479,677 A |   | 11/1969 | Burns | |
| 3,484,883 A | * | 12/1969 | Van Marle | 14/71.5 |
| 3,581,331 A | * | 6/1971 | Fisher et al. | 14/71.5 |
| 3,639,934 A | * | 2/1972 | Eggert, Jr. | 14/71.5 |
| 3,665,536 A | * | 5/1972 | Jackson | 14/71.5 |

(Continued)

FOREIGN PATENT DOCUMENTS
CN        1676424 A        10/2005

*Primary Examiner* — Raymond Addie
(74) *Attorney, Agent, or Firm* — The Webb Law Firm

(57) ABSTRACT

An open and close apparatus for a shelter of a boarding bridge includes at least one extension arm means provided on the portal frame, each extension arm means comprising: an upper arm having one end pivotally coupled with a column of the portal frame; a lower arm having one end pivotally coupled with the other end of the upper arm and the other end pivotally coupled with an upper end of the flexible frame; a propeller controlled by a control system and including an extension rod and a main body for accommodating the extension rod, wherein one end of the extension rod is pivotally coupled with the lower arm, and one end of the main body is pivotally coupled with the upper arm; and overpressure protection means for buffering an acting force between the shelter and the aircraft shell, and the overpressure protection means is connected to the control system such that when the acting force exceeds a predetermined value, the control system controls the propeller to stop protruding and/or contracting the extension rod. The open and close apparatus in the present invention can perfectly seal with an entrance of an aircraft with a large profile curve variety and is simple in configuration, and can prevent the aircraft shell from distortion or damage when the aircraft shell squeezes or collides with the shelter.

9 Claims, 5 Drawing Sheets

U.S. PATENT DOCUMENTS

| | | | |
|---|---|---|---|
| 3,693,204 A * | 9/1972 | Eggert, Jr. | 14/71.5 |
| 3,722,017 A * | 3/1973 | Gacs et al. | 14/71.5 |
| 3,816,867 A * | 6/1974 | Shirzad et al. | 14/71.5 |
| 3,843,987 A * | 10/1974 | Lodjic | 14/71.5 |
| 4,120,067 A | 10/1978 | Hone et al. | |
| 4,333,195 A | 6/1982 | Lichti | |
| 4,712,339 A * | 12/1987 | Wenham et al. | 14/71.5 |
| 4,817,223 A * | 4/1989 | Koch | 14/71.1 |
| 5,257,431 A * | 11/1993 | Larson et al. | 14/71.5 |
| 5,267,368 A * | 12/1993 | Saunders | 14/71.5 |
| 6,109,854 A * | 8/2000 | Thompson et al. | 414/398 |
| 6,757,926 B2 | 7/2004 | Konya | |
| 2006/0174429 A1 | 8/2006 | Koch et al. | |

\* cited by examiner

OPEN AND CLOSE APPARATUS FOR A SHELTER OF A BOARDING BRIDGE

FIELD OF THE INVENTION

The present invention relates to a boarding bridge, and more particularly, to an open and close apparatus for a shelter of a boarding bridge.

BACKGROUND OF THE INVENTION

The difference between a new type aircraft and a conventional aircraft lies in that there is a transition region with a big bend angle between an aircraft nose and an aircraft fuselage on an aircraft shell of the new type aircraft. At the same time, since the current boarding bridge is designed and developed by the combination of the features of the conventional aircraft shell, when the current boarding bridge is used for the new type aircraft, a gap will formed between the shelter of the current boarding bridge and the new type aircraft shell and results in a poor sealing therebetween. In sleet weather, the sleet usually wets the passenger's clothing and baggage through the gap, and what is more, the sleet sometimes flows into the interior of the aircraft through the gap.

For overcoming the above technical problems, some manufacturers have done many attempts, for example, a Chinese Application CN200510063002.6 discloses sealing means for an aircraft passenger ramp or an aircraft boarding bridge, which comprises a bellows spanned on a connecting floor and having an open end with a flexible frame and another open end provided on a portal frame. In this patent application, the portal frame is fixed onto the ramp or the boarding bridge. The flexible frame sticks on the aircraft shell when the shelter is removed. The sealing means is also provided with an operating device for spreading and retracting the shelter. The operating device includes a driven rotatable shaft through which at least one pulling device connected to the flexible frame can be winded and unwinded. The operating device has two spaced-apart pivot arms, each comprising an upper arm and a lower arm connected to the upper arm via a hinge. The upper arm is pivotably attached to the portal frame near the roof of some shelter, and the lower arm is pivotably attached to the flexible frame. An expanding device is provided to spread the shelter. Although the sealing means may realize a perfect sealing with an entrance of the new type aircraft, the configuration of this sealing means is relative complex and its service life is relative short. In addition, after the flexible frame is coupled to the entrance of the aircraft, the gravity of the interior of the aircraft decreases due to the person or baggage leaving the aircraft, thus the entire aircraft fuselage moves upward and then the aircraft shell often squeezes or collides with the shelter. Both the lower arm and the upper arm in this patent application are rigid arms, so the acting force therebetween often results in the distortion or damage of the aircraft shell when the aircraft shell and the shelter squeeze or collide with each other. Therefore, it is necessary to modify the configuration of this kind of boarding bridge.

SUMMARY OF THE INVENTION

The object of the present invention is to provide an open and close apparatus for a shelter of a boarding bridge, which is simple in configuration, can prevent the aircraft shell from distortion or damage when the aircraft shell squeezes or collides with the shelter, and can securely seal with an entrance of the aircraft with a large profile curve variety.

For achieving the above object, the present invention adopts the following technical solution: an open and close apparatus for a shelter of a boarding bridge, the shelter being fixed above a floor of the boarding bridge and having two open ends, one of which is provided with a flexible frame being able to protrude and stick on an aircraft shell and the other of which is connected to a portal frame of the boarding bridge, the open and close apparatus being provided between the flexible frame and the portal frame, wherein the open and close apparatus for the shelter of the boarding bridge includes at least one extension arm means provided on the portal frame, and each extension arm means comprises:

an upper arm having one end pivotally coupled with a column of the portal frame;

a lower arm having one end pivotally coupled with the other end of the upper arm and the other end pivotally coupled with an upper end of the flexible frame;

a propeller controlled by a control system and including an extension rod and a main body for accommodating the extension rod, wherein one end of the extension rod is pivotally coupled with the lower arm, and one end of the main body is pivotally coupled with the upper arm; and overpressure protection means for buffering an acting force between the shelter and the aircraft shell, and connecting to the control system such that the control system controls the propeller to stop protruding and/or contracting the extension rod when the acting force exceeds a predetermined value.

In the above open and close apparatus, the overpressure protection means may include: an elastic component comprising a spring and a threaded rod; and a signal control component comprising a two-position limit switch and a swing rod connected to the two-position limit switch, wherein the threaded rod passes through the spring to drive the swing rod to move.

In the above open and close apparatus, the upper arm and the lower arm may be pivotally coupled by a connecting shaft, one end of the threaded rod may pass through the spring and connect to the connecting shaft, the other end of the threaded rod may be slideablely disposed at the other end of the upper arm adjacent to the connecting shaft, an idle wheel may be disposed on a shaft end of the connecting shaft, the swing rod may be provided with a roller pressing against the idle wheel, and the two-position limit switch may be provided at the other end of the upper arm adjacent to the connecting shaft.

In the above open and close apparatus, the threaded rod passing through the spring may be disposed adjacent to a pivot point of the lower arm and the flexible frame, one end of the threaded rod may be connected to the flexible frame, the other end of the threaded rod may press against a roller disposed on the swing rod, and the two-position limit switch is provided at the other end of the lower arm adjacent to the flexible flame.

In the above open and close apparatus, the open and close apparatus for the shelter of the boarding bridge further includes an extendable pushing rod, one end of which is pivotally coupled with the portal frame, and the other end of which is pivotally coupled with the upper arm.

In the above open and close apparatus, the open and close apparatus for the shelter of the boarding bridge further includes an extendable pushing rod, one end of which is pivotally coupled with the floor of the boarding bridge, and the other end of which is pivotally coupled with the upper arm.

In the above open and close apparatus, the propeller may be an electric propeller.

In the above open and close apparatus, the open and close apparatus for the shelter of the boarding bridge further includes an elastic buffer mechanism which is disposed on the portal frame and corresponds to the upper arm in a retraction state.

In the above open and close apparatus, the open and close apparatus for the shelter of the boarding bridge includes two extension arm means provided on both sides of the portal frame respectively Compared with the related art, the present invention has the following advantageous effects:

(1) since the propeller having extension function is provided between the upper arm and the lower arm in the present invention, and the configuration features of the rotatable shaft and pulling devices for winding and unwinding and the like in the related art are omitted, the open and close apparatus of the present invention has an advantage of simple configuration compared with the related art;

(2) since the propeller is connected to the control system, and under the control of the control system the propeller can realize the automatic extension or contraction motion, the shelter can spread or retract automatically, thus the open and close apparatus of the present invention can be automatically operated conveniently;

(3) since the overpressure protection means is provided in the present invention, and the elastic component and the signal control component of the overpressure protection means can cooperate to buffer the acting force occurred by the squeeze and collision between the aircraft shell and the shelter when the aircraft shell squeezes or collides with the shelter, the distortion or damage of the aircraft shell due to the squeeze and collision between the aircraft shell and the shelter can be prevented, thereby the aircraft shell can be protected effectively; and (4) the elastic buffer mechanism is provided at the portion of the portal frame corresponding to the upper arm in the retraction state in the present invention, if the upper arm collides with the portal frame when the upper arm retracts, the elastic buffer mechanism can elastically buffer the upper arm, thus the damage of the upper arm or the portal frame due to the rigid collision between the upper arm and the portal frame will be avoided, thereby the service life of the open and close apparatus in the present invention can be extended.

DETAILED DESCRIPTION OF PREFERRED EMBODIMENTS

Figure 1:
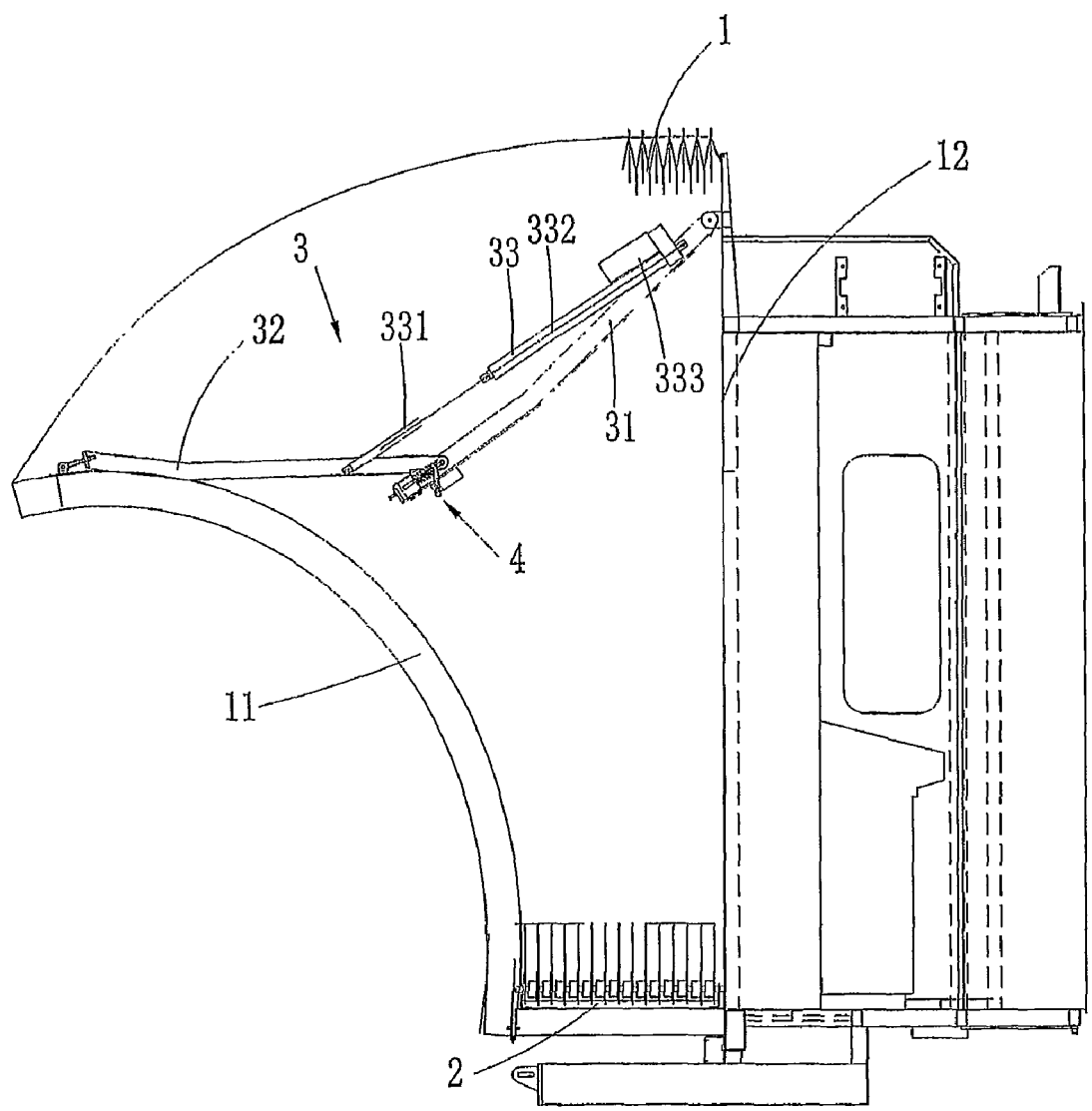
FIG. 1 is a schematic configuration view of the present invention when the shelter is spreading.
Figure 2:
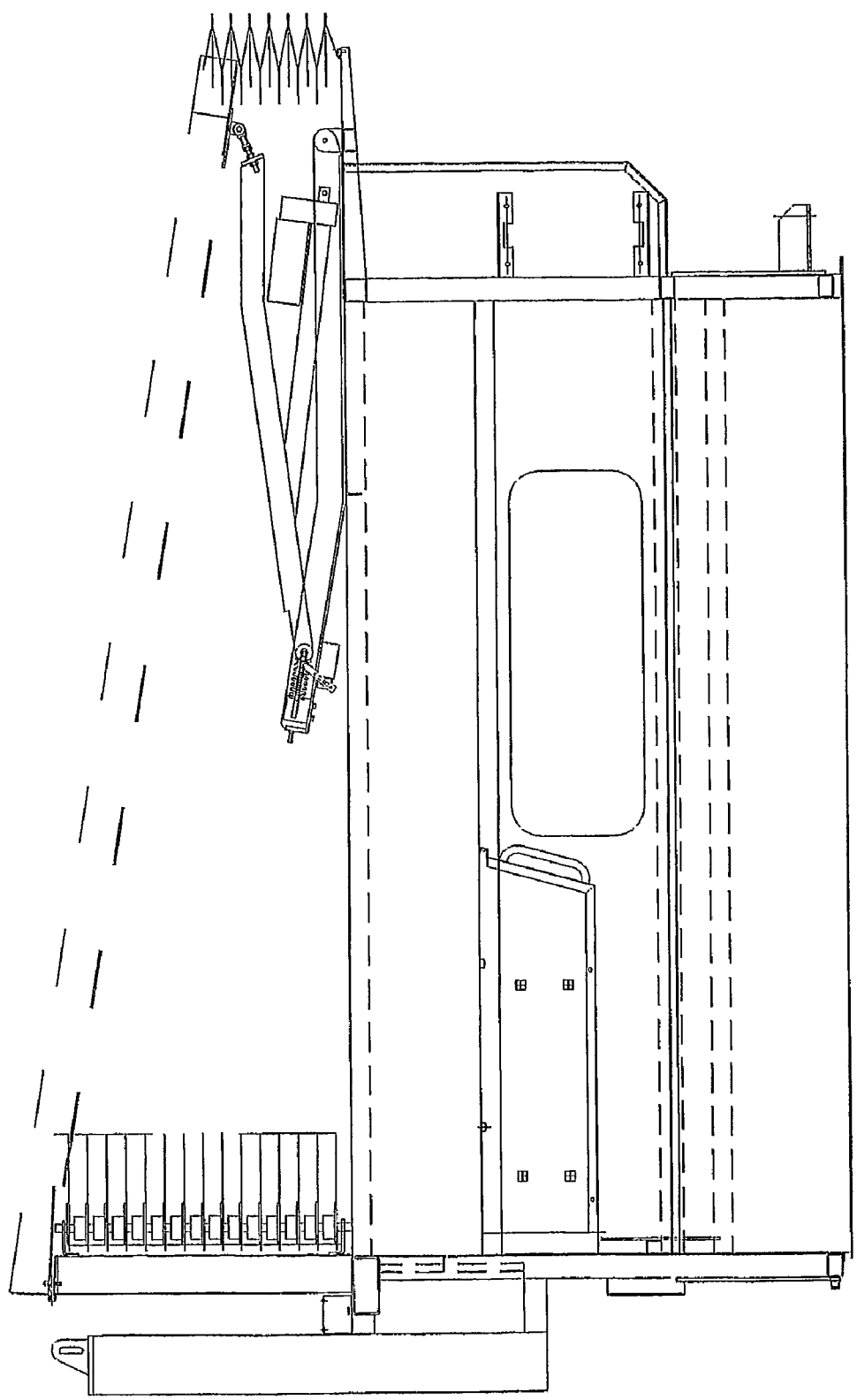
FIG. 2 is a schematic configuration view of the present invention when the shelter is retracting.

Referring to FIGS. 1 and 2, a boarding bridge in the present invention includes a shelter 1 and a floor 2, and the shelter 1 has wrinkles and is fixed above the floor 2. The shelter 1 is made of flexible material and can be folded many times along the wrinkles. The typical shape of the shelter 1 is "U" shape (not limited to this shape). The lower end of the shelter 1 is closed by the floor 2 provided for the person to go aboard, thus a boarding passage for receiving an entrance of an aircraft is formed.

The shelter 1 has two open ends, one of which is connected to a flexible frame 11 which can protrude under the propel of an external force to stick on the aircraft shell, and the other of which is connected to a portal frame 12 of the boarding bridge.

An open and close apparatus 3 involved in the present invention is arranged between the flexible frame 11 and the portal frame 12, and includes at least one extension arm means provided on the portal frame (see FIG. 4), each extension arm means comprising an upper arm 31, a lower arm 32 and a propeller 33. One end of the upper arm 31 and one end of the lower arm 32 are pivotally coupled together, the other end of the upper arm 31 is pivotally coupled with the portal frame 12, and the other end of the lower arm 32 is pivotally coupled with the flexible frame 11. Under the propel of the lower arm 32, the flexible frame 11 can protrude to stick on the aircraft shell.

Figure 4:
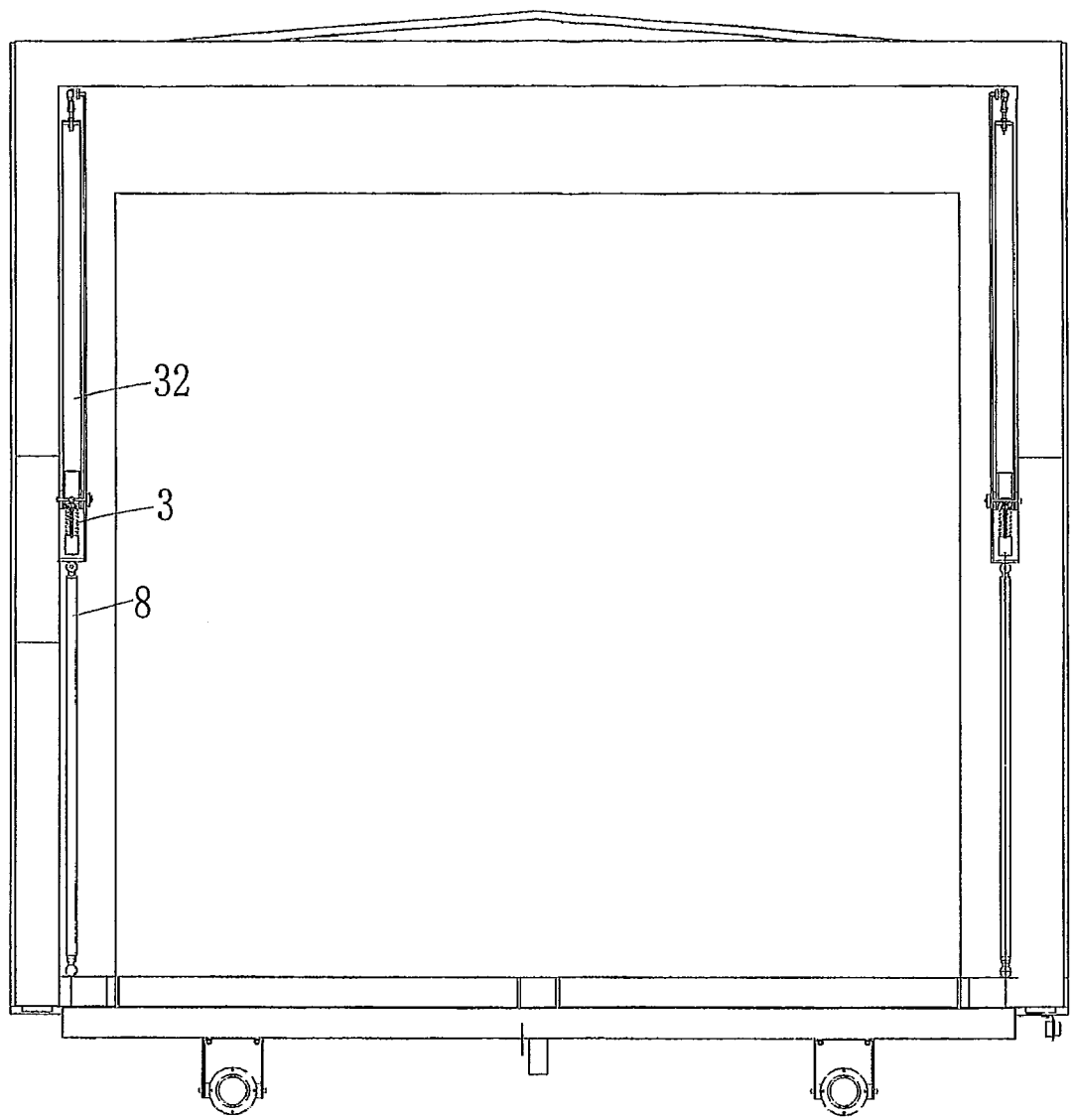
FIG. 4 is a lateral schematic configuration view of the present invention provided with the pushing rod.

Preferably, as shown in FIG. 4, the open and close apparatus for the shelter of the boarding bridge includes two extension arm means provided on both sides of the portal frame respectively.

Preferably, the propeller 33 is an electric propeller, but it also can be a pneumatic propeller or other replaceable forms of the electric propeller. For convenience, the propeller 33 is an electric propeller in the following description unless specified.

The propeller 33 is provided between the upper arm 31 and the lower arm 32, and includes an extension rod 331, a main body 332 for accommodating the extension rod 331 and a motor 333. The extension rod 331 and the main body 332 are respectively located at two ends of the propeller 33, and the extension rod 331 can extend and contract within the main body 332 under the action of the motor 333. The main body 332 at one end of the propeller 33 is connected to the upper arm 31 preferably near the pivot point of the upper arm 31 and portal frame 12. The extension rod 331 on the other end of the propeller 33 is connected to the lower arm 32 preferably near the pivot point of the lower arm 32 and the upper arm 31. The motor 333 is connected to a control system (not shown in the drawings). The control system fulfills an extension or contraction motion of the extension rod 331 of the propeller 33 by controlling the motion of the motor 333.

The control system may be a manual control switch, computer control means and the like. Under the control of the control system, the motor provided inside the propeller can rotate positively or negatively, thus driving the extension rod 331 to perform the extension or contraction motion within the main body 332. A predetermined value is set in the control system, and when the acting force between the shelter 1 and the aircraft shell exceeds the predetermined value, the control system controls the propeller 33 to stop protruding and/or contracting the extension rod 331.

In the above configuration, the lower arm 32 spreads when the extension rod 331 of the propeller 33 protrudes from the inside of the main body 332 under the control of the control system. Since the lower arm 32 is connected to the flexible frame 11, when the extension rod 331 of the propeller 33 protrudes from the inside of the main body 332, the flexible frame 11 drives the shelter 1 to move away from the portal frame 12 under the propel of the lower arm 32, thus the shelter 1 spreads. When the extension rod 331 of the propeller 33 contracts into the main body 332, the lower arm 32 drives the flexible frame 11 to move close to the portal frame 12 under the drawing of the extension rod 331, thus the shelter 1 retracts.

Figure 3:
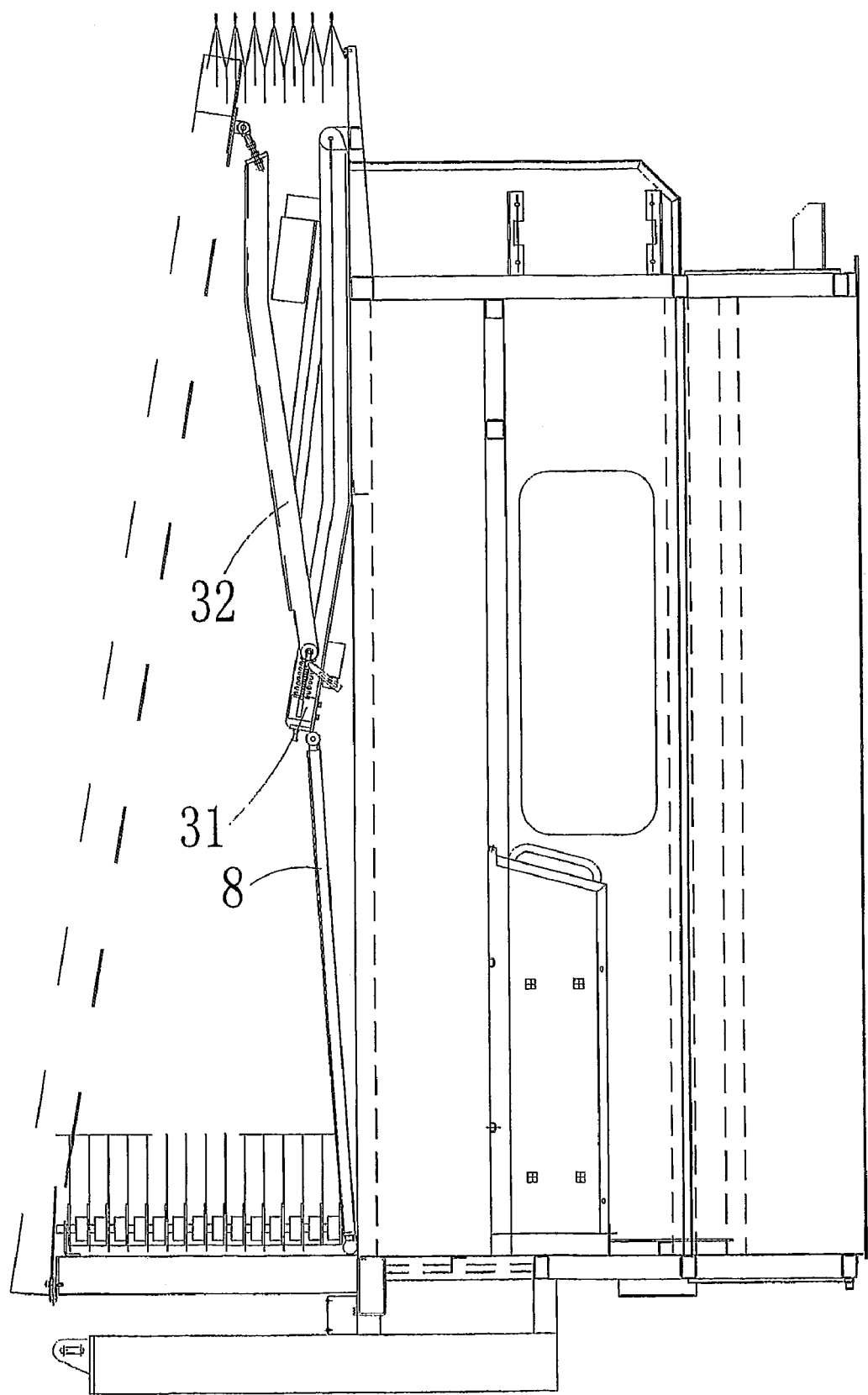
FIG. 3 is a schematic configuration view of the present invention provided with a pushing rod.

Referring to FIGS. 3 and 4, a pushing rod 8 is provided between the upper arm 31 and the floor 2 in the present invention. One end of the pushing rod 8 is connected to the end of the upper arm 31 adjacent to the pivot point of the upper arm 31 and the lower arm 32, and the other end of the pushing rod 8 is connected to the floor 2 adjacent to the portal frame 12, certainly, the other end of the pushing rod 8 may also be connected to the portal frame 12 adjacent to the connection point of the shelter 1 and the portal frame 12. The pushing rod 8 is used to cooperate with the propeller 33 to propel the upper arm 31 such that the upper arm 31 can spread.

The propeller 33 operates with the assistance of the pushing rod 8 to propel the upper atm 31 to spread, then the upper arm 31 drives the lower arm 32 to move, thus the flexible frame 11 can spread to contact with the aircraft shell.

Figure 5:
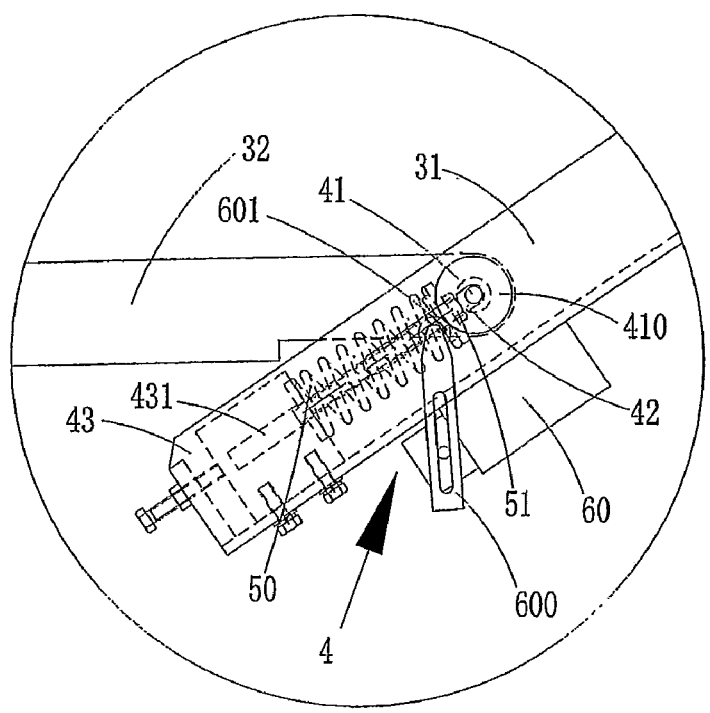
FIG. 5 is a schematic configuration view of the first embodiment of overpressure protection means according to the present invention, which shows the partial enlarged view of the overpressure protection means installed on the upper arm and the lower arm.

It can be seen from FIG. 5 in combination with FIG. 4, overpressure protection means 4 is provided adjacent to the pivot point of the upper arm 31 and the lower arm 32 in the present invention. If the shelter 1 squeezes or collides with the aircraft shell during the interconnection of the shelter 1 and the entrance of the aircraft, the overpressure protection means 4 can buffer the impulsive force occurred by the collision between the shelter 1 and the aircraft shell or the stress occurred by the squeeze between the aircraft shell and the shelter 1, thus prevent the aircraft shell from distortion or damage due to the collision or squeeze between the aircraft shell and the shelter 1.

The overpressure protection means 4 includes an elastic component and a signal control component, and the elastic component and the signal control component cooperate to buffer the acting force occurred by the collision between the shelter 1 and the aircraft shell and the stress occurred by the squeeze between the aircraft shell and the shelter 1. The overpressure protection means 4 is connected to the control system such that the control system controls the propeller 33 to stop protruding and/or contracting the extension rod 331 when the acting force between the shelter 1 and the aircraft shell exceeds the predetermined value.

The elastic component includes a spring 50 and a threaded rod 51. The upper arm 31 and the lower arm 32 are pivotally coupled by a connecting shaft 41. The upper arm 31 has an elongated slot 42 extending from the connection point of the upper arm 31 and the connecting shaft 41 toward the end of the upper arm 31 adjacent to the connecting shaft 41, in which the connecting shaft 41 can slide. An installing seat 43 is fixed at the end of the upper arm 31 adjacent to the connecting shaft 41. A sliding hole 431 is provided at the end of the installing seat 43 connecting to the upper arm 31. The threaded rod 51 passes through the spring 50. Moreover, one end of the threaded rod 51 passes through the sliding hole 431 to connect with the installing seat 43, and the other end of the threaded rod 51 is connected to the connecting shaft 41.

The signal control component includes a two-position limit switch 60 and a swing rod 600 connected to the two-position limit switch 60. The two-position limit switch 60 is provided at the end of the upper arm 31 adjacent to the connecting shaft 41 and is connected to the control system of the boarding bridge. A first angle position and a second angle position of the swing rod 600 are formed by the restriction of the two-position limit switch 60. When the swing rod 600 is in the first angle position, the control system of the boarding bridge will send a stop signal, then the propeller 33 stops protruding and the shelter 1 stops spreading; when the swing rod 600 is in the second angle position, the control system of the boarding bridge will send a retraction signal, then the propeller 33 contracts and the upper arm 31 and the lower arm 32 retract, thus the shelter 1 retracts. An idle wheel 410 is provided at a shaft end of the connecting shaft 41, a roller 601 is provided at a free end of the swing rod 600, and the roller 601 presses against the idle wheel 410.

After the persons or goods leave the aircraft through the passage closed by the shelter 1 and the entrance of the aircraft, the entire aircraft fuselage will move upward since the gravity of the interior of the aircraft decreases. When the aircraft fuselage moves upward, the aircraft shell often squeezes or collides with the shelter 1, thus an acting force will occurred therebetween. When the acting force reaches the predetermined value, under the action of the acting force, the lower arm 32 deflects in the direction of the acting force subjected about the connecting shaft 41, and drives the connecting shaft 41 to slide downward along the elongated slot 42 shown in FIG. 5. When the connecting shaft 41 slides, the idle wheel 410 provided on its shaft end moves downward together. Since the roller 601 presses against the idle wheel 410, the roller 601 deflects under the action of the idle wheel 410, thus the swing rod 600 connected to the roller 601 swings. When the swing rod 600 swings to the first angle position restricted by the two-position limit switch, the control system of the boarding bridge will send a stop signal, then the propeller 33 stops protruding and the shelter 1 stops spreading; when the swing rod 600 swings to the second angle position restricted by the two-position limit switch, the control system of the boarding bridge will send a retraction signal, then the propeller 33 contracts and the upper arm 31 and the lower arm 32 retract, thus the shelter 1 retracts. Since the positions of the upper arm 31 and the lower arm 32 are repeatedly adjusted in above-mentioned manner, the excellent seal between the shelter 1 and the entrance of the aircraft can be due to the collision or squeeze between the aircraft shell and the shelter 1, the aircraft shell can be protected from distortion or damage due to the collision or squeeze.

Figure 6:
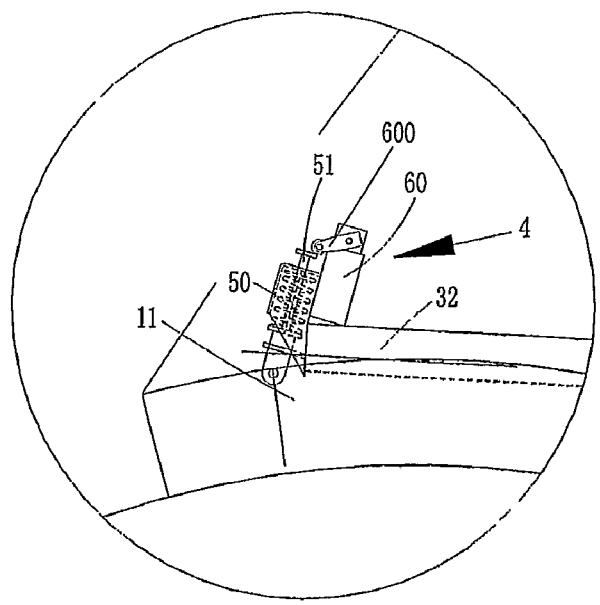
FIG. 6 is a schematic configuration view of the second embodiment of the overpressure protection means according to the present invention, which shows the partial enlarged view of the overpressure protection means installed on the upper arm and the lower arm.

Referring to FIG. 6, the configuration of the second embodiment of the overpressure protection means in the present invention is similar to the first embodiment, and also includes an elastic component and a signal control component. The elastic component includes a spring 50 and a threaded rod 51, and the signal control component includes a two-position limit switch 60 and a swing rod 600 connected to the two-position limit switch 60. The two-position limit switch 60 is connected to the control system of the boarding bridge. A first angle position and a second angle position of the swing rod 600 are formed by the restriction of the two-position limit switch 60. When the swing rod 600 is in the first angle position, the control system of the boarding bridge will send a stop signal, then the propeller 33 stops protruding and the shelter 1 stops spreading; when the swing rod 600 is in the second angle position, the control system of the boarding bridge will send a retraction signal, then the propeller 33 contracts and the upper arm 31 and the lower arm 32 retract, thus the shelter 1 retracts. The difference between the first embodiment and the second embodiment lies in that the elastic component and the signal control component are provided near the pivot point of the lower arm 32 and the flexible frame 11. In the second embodiment, the threaded rod 51 passes through the spring 50, one end of the threaded rod 51 is connected to the flexible frame 11 and the other end of the threaded rod 51 presses against the roller 601 provided on the swing rod 600. The roller 601 drives the swing rod 600 to swing under the action of the two-position limit switch 60 connected to the swing rod 600.

After the persons or goods leave the aircraft from the passage closed by the shelter 1 and the entrance of the aircraft, the entire aircraft fuselage will move upward since the gravity of the interior of the aircraft decreases. When the aircraft fuselage moves upward, the aircraft shell often squeezes or collides with the shelter 1, thus an acting force will occurred therebetween. Under the action of the acting force, the threaded rod 51 moves in the direction of the acting force subjected and propels the roller 601 pressed against the threaded rod 51 so as to drive the swing rod 600 to swing, thus the two-position limit switch 60 acts. When the swing rod 600 swings to the first angle position restricted by the two-position limit switch, the control system of the boarding bridge will send a stop signal, then the propeller 33 stops protruding and the shelter 1 stops spreading; when the swing rod 600 swings to the second angle position restricted by the two-position limit switch, the control system of the boarding bridge will send a retraction signal, then the propeller 33 contracts and the upper arm 31 and the lower arm 32 retract, thus the shelter retracts. Since the positions of the upper arm 31 and the lower arm 32 are repeatedly adjusted in above-mentioned manner, the excellent seal between the shelter 1 and the entrance of the aircraft will be maintained all the time, and the distortion or damage of the aircraft shell caused by the acting force due to the collision or squeeze therebetween will not happen.

In the above embodiments of the present invention, an elastic buffer mechanism is provided at the portal frame 12. The elastic buffer mechanism is preferably made of elastic material, and locates at a portion of the portal frame 12 corresponding to the upper arm 31 in the retraction state. The elastic material is preferably rubber and the like. When the upper arm 31 retracts under the action of the propeller 33, the elastic material can play the role of an elastic buffer if the upper arm 31 collides with the portal frame 12, thus the service life of the open and close apparatus in present invention can be extended.

Based on the common knowledge, the present invention can be implemented by other embodiments without departing from the spirit essence or essential features of the present invention. Therefore, the above disclosed embodiments only exemplify but not limit the present invention. It is intended that the present invention covers the modifications and variations of this invention provided they come within the scope of the appended claims and their equivalents.

What is claimed is:

1. An open and close apparatus for a shelter of a boarding bridge, the shelter being fixed above a floor of the boarding bridge and having two open ends, one of which is provided with a flexible frame being able to protrude and stick on an aircraft shell and the other of which is connected to a portal frame of the boarding bridge, the open and close apparatus being provided between the flexible frame and the portal frame, wherein the open and close apparatus for the shelter of the boarding bridge includes at least one extension arm means provided on the portal frame, and each extension arm means comprises:

an upper arm having one end pivotally coupled with a column of the portal frame;

a lower arm having one end pivotally coupled with the other end of the upper arm and the other end pivotally coupled with an upper end of the flexible frame;

a propeller controlled by a control system and including an extension rod and a main body for accommodating the extension rod, wherein one end of the extension rod is pivotally coupled with the lower arm, and one end of the main body is pivotally coupled with the upper arm; and overpressure protection means for buffering an acting force between the shelter and the aircraft shell, and connecting to the control system such that the control system controls the propeller to stop protruding and/or contracting the extension rod when the acting force exceeds a predetermined value.

2. The open and close apparatus according to claim 1, wherein the overpressure protection means includes:

an elastic component comprising a spring and a threaded rod; and a signal control component comprising a two-position limit switch and a swing rod connected to the two-position limit switch, wherein the threaded rod passes through the spring to drive the swing rod to move.

3. The open and close apparatus according to claim 2, wherein the upper arm and the lower arm are pivotally coupled by a connecting shaft, one end of the threaded rod passes through the spring and connects to the connecting shaft, the other end of the threaded rod is slidably disposed at the other end of the upper arm adjacent to the connecting shaft, an idle wheel is disposed on a shaft end of the connecting shaft, the swing rod is provided with a roller pressing against the idle wheel, and the two-position limit switch is provided at the other end of the upper arm adjacent to the connecting shaft.

4. The open and close apparatus according to claim 2, wherein the threaded rod passing through the spring is disposed adjacent to a pivot point of the lower arm and the flexible frame, one end of the threaded rod is connected to the flexible frame, the other end of the threaded rod presses against a roller disposed on the swing rod, and the two-position limit switch is provided at the other end of the lower arm adjacent to the flexible flame.

5. The open and close apparatus according to claim 1, wherein the open and close apparatus for the shelter of the boarding bridge further includes an extendable pushing rod, one end of which is pivotally coupled with the portal frame, and the other end of which is pivotally coupled with the upper arm.

6. The open and close apparatus according to claim 1, wherein the open and close apparatus for the shelter of the boarding bridge further includes an extendable pushing rod, one end of which is pivotally coupled with the floor of the boarding bridge, and the other end of which is pivotally coupled with the upper arm.

7. The open and close apparatus according to claim 1, wherein the propeller is an electric propeller.

8. The open and close apparatus according to claim 1, wherein the open and close apparatus for the shelter of the boarding bridge further includes an elastic buffer mechanism which is disposed on the portal frame and corresponds to the upper arm in a retraction state.

9. The open and close apparatus according to claim 1, wherein the open and close apparatus for the shelter of the boarding bridge includes two extension arm means provided on both sides of the portal frame respectively.

* * * * *